(12) United States Patent
Rani et al.

(10) Patent No.: US 12,367,338 B2
(45) Date of Patent: Jul. 22, 2025

(54) ASPECT BASED SENTIMENT ANALYSIS WITH CONTEXTUAL GROUPING OF ASPECTS

(71) Applicant: Genpact USA, Inc., New York, NY (US)

(72) Inventors: Varsha Rani, Gurgaon (IN); Prakash Selvakumar, Bangalore (IN); Sreekanth Menon, Bangalore (IN)

(73) Assignee: Genpact USA, Inc., New York, NY (US)

( * ) Notice: Subject to any disclaimer, the term of this patent is extended or adjusted under 35 U.S.C. 154(b) by 326 days.

(21) Appl. No.: 17/994,875

(22) Filed: Nov. 28, 2022

(65) Prior Publication Data

US 2024/0176950 A1    May 30, 2024

(51) Int. Cl.
G06F 17/00 (2019.01)
G06F 16/35 (2019.01)
G06F 40/211 (2020.01)
G06Q 30/0282 (2023.01)

(52) U.S. Cl.
CPC ............ *G06F 40/211* (2020.01); *G06F 16/35* (2019.01); *G06Q 30/0282* (2013.01)

(58) Field of Classification Search
None
See application file for complete search history.

(56) References Cited

U.S. PATENT DOCUMENTS 8,799,773 B2    8/2014  Reis et al.
9,633,007 B1    4/2017  Brun et al.
10,991,048 B1 *  4/2021  Blair .................. G06N 3/08
11,080,601 B2 *  8/2021  Lyske ................. G10L 15/16
2018/0053107 A1   2/2018  Wang et al.
2021/0012200 A1 * 1/2021  Lyske ................. G06V 10/82
2021/0312124 A1 * 10/2021 Agarwal .............. G06F 40/30
2021/0383230 A1 * 12/2021 Lyske ................. G06N 3/084
2022/0180065 A1 * 6/2022  Liu .................... G06N 3/08
2022/0237386 A1 * 7/2022  Cheng ................. G06F 40/205
2022/0398271 A1 * 12/2022 Wu .................... G06N 5/025

FOREIGN PATENT DOCUMENTS

CA        2711665 C    3/2015

OTHER PUBLICATIONS

Roldos, I., "What is Aspect-Based Sentiment Analysis?", MonkeyLearn Blog, (Dec. 6, 2019), https://monkeylearn.com/blog/what-is-aspect-based-sentiment-analysis/, 10 pages.

* cited by examiner

*Primary Examiner* — Satwant K Singh
(74) *Attorney, Agent, or Firm* — Goodwin Procter LLP

(57) ABSTRACT

A method for aspect-based sentiment analysis includes receiving a collection of textual data, extracting a set of aspects and a set of sentiment words from the textual data, identifying a set of aspect-sentiment word pairs from the extracted aspects and sentiment words, identifying a subset of aspect-sentiment word pairs according to a set of predefined rules, and grouping a plurality of aspects associated with the subset of aspect-sentiment word pairs into one or more clusters. Each of the set of aspect-sentiment word pairs includes an aspect word from the set of aspects and a sentiment word from the set of sentiment words. Each of the subset of aspect-sentiment word pairs is determined to have an aspect-sentiment relationship according to the set of predefined rules.

18 Claims, 14 Drawing Sheets

| Feature | Details |
|---|---|
| Input | This app helps create a seamless experience, from early check in options, keyless entry into our room, mobile order functions, and options that allow me to plan when I leave for and arrive back from all parks. |
| Aspect | {'This app', 'a seamless experience', 'keyless entry', 'all parks', 'options', 'our room', 'early check', 'mobile order functions'} |
| Aspect - Opinion | [('seamless', 'experience'), ('early', 'check'), ('keyless', 'entry')] |

FIG. 2A

| | | |
|---|---|---|
| Rule 1 | O -> O-Dep -> A<br>O : {O}<br>O-Dep : {MR}<br>POS(A) : {'NN'} | |
| Rule 2 | O -> O-Dep -> H <- A-Dep <- A<br>O : {O}<br>O/A-Det : {MR}<br>POS(A) : {'NOUN'} | |
| Rule 3 | O -> O-Dep -> A<br>A : {A}<br>O-Dep : {MR}<br>POS(A) : {NN} | |
| Rule 4 | O -> O-Dep -> H <- A-Dep <- A<br>A : {A}<br>O-Dep : {MR}<br>A-Dep : {MR}<br>POS(O): JJ | |
| Rule 5 | Ai(j)->Ai(j)-Dep->Aj(i)<br>Aj(i): {A}<br>Ai(j)-Dep: {CONJ},<br>POS(Ai(j)):{NN} | |
| Rule 6 | Ai->Ai-Dep->H<-Aj-Dep<-Aj<br>Ai:{A},<br>(Ai-Dep == Aj-Dep) OR (Ai-Dep: subj AND Aj-Dep:'obj')<br>POS(Aj): {NN} | |
| Rule 7 | Oi(j)->Oi(j)-Dep->Oj(i)<br>Oj(i):{O}<br>Oi(j)-Dep:{CONJ}<br>POS(Oi(j)):{JJ} | |
| Rule 8 | Oi->Oi-Dep->H<-Oj-Dep<-Oj<br>Oi:{O}<br>(Oi-Dep==Oj-Dep) OR (Oi/Oj-Dep: {pnmod, mod})<br>POS(Oj):{JJ} | |

FIG. 7C

ASPECT BASED SENTIMENT ANALYSIS WITH CONTEXTUAL GROUPING OF ASPECTS

TECHNICAL FIELD

The disclosure generally relates to computed-based natural language processing and, more particularly, to a computer-based framework for sentiment analysis with a contextual grouping of aspects.

BACKGROUND

Computer-based sentiment analysis addresses the emotion, attitude, and sentiment of a text using natural language processing techniques. It is used in multiple places for analyzing data like customer reviews, blogs, survey responses, social media posts, and so on. Insights from sentiment analysis can be very useful in understanding customer opinions on products and services, thereby facilitating manufacturers, businesses, and certain other entities to make proper decisions and/or provide further recommendations.

Simple sentiment analysis has been around for decades, but it does not reveal complete insights from the data. Multiple variants of sentiment analysis have been evolving over time, like rule-based systems, machine learning, and hybrid solutions. But most are designed to serve a specific use case and are unable to perform well for general purposes due to domain (e.g., specific subject) dependency or lack of compatibility.

In addition, current existing sentiment analysis tools tend to detect the overall sentiment/polarity of the text/paragraph/document, but ignore the mentioned entities (e.g. food, service, quality) and their attributes (e.g. tasty, sloppy, best). When the sentiment analysis of text is done at a document/sentence level, the results might not provide meaningful insights. For example, if a document is concerned about multiple items and a majority of them are negative (e.g., short battery life, noisy speaker for a cellphone), that does not mean that all the items concerned are negative (e.g., the phone overall is good). Accordingly, current existing computer-based sentiment analysis tools usually cannot provide a comprehensive view of the sentiments in the text/paragraph/document.

SUMMARY

To address the aforementioned shortcomings, a system and computer-implemented method for aspect-based sentiment analysis are provided. The method includes receiving a collection of textual data, extracting a set of aspects and a set of sentiment words from the textual data, identifying a set of aspect-sentiment word pairs from the extracted aspects and sentiment words, identifying a subset of aspect-sentiment word pairs according to a set of predefined rules, and grouping a plurality of aspects associated with the subset of aspect-sentiment word pairs into one or more clusters. Each of the set of aspect-sentiment word pairs includes an aspect word from the set of aspects and a sentiment word from the set of sentiment words. Each of the subset of aspect-sentiment word pairs is determined to have an aspect-sentiment relationship according to the set of predefined rules.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 2A illustrates an exemplary outcome of aspect-based sentiment analysis related to aspect extraction and aspect-sentiment relationship determination, according to some embodiments.

FIG. 7C illustrates some exemplary rules for aspect-sentiment relationship determination, according to some embodiments.

DETAILED DESCRIPTION

Figure 1:
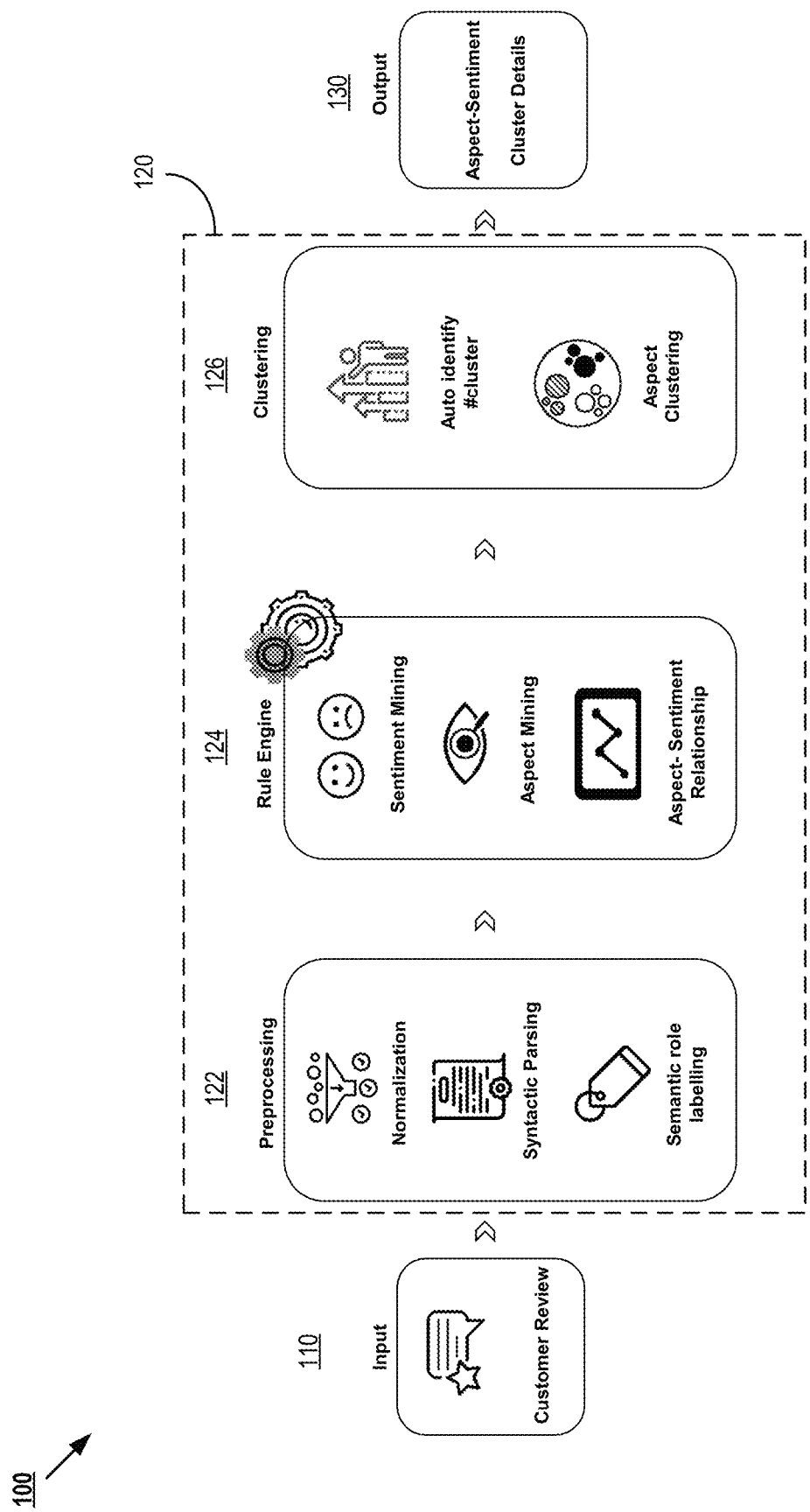
FIG. 1 illustrates a high-level overview of an exemplary process for aspect-based sentiment analysis with conceptual aspect clustering, according to some embodiments.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the spirit and scope of the present disclosure. It is also to be understood that features of the various embodiments and examples herein can be combined, exchanged, or removed without departing from the spirit and scope of the present disclosure.

Nowadays, customers are more vocal than ever, and thus they leave a lot of feedback and a wealth of information to let businesses know what they are doing right or wrong. Wading through all this feedback and information can be really challenging or impractical if just relying on humans to review by hand. For example, it is impossible for a team from a company to manually sift through thousands of tweets, customer support conversations, customer reviews, and the like, especially if the team wants to analyze information on a granular level. The computer-based sentimental analysis allows businesses to automatically analyze a massive amount of data in detail and in real-time to immediately identify what the customers are complaining about and fix them in real time.

In addition, while humans are able to differentiate between aspects and sentiments within a text, they are not always objective since people are generally influenced by personal experiences, thoughts, beliefs, and interests, and only agree about 60-65% of the time when determining the sentiments for pieces of text. By using a natural language processing-based aspect analysis model, a business can apply the same criteria to all texts, meaning that the results will be more consistent, accurate, and unbiased.

In accordance with various embodiments, the methods and functions described herein may be implemented as one or more software programs running on a computer processor or controller, for example, on a computing device, such as a tablet computer, smartphone, personal computer, server, or any other computing device. Dedicated hardware implementations including, but not limited to, application-specific integrated circuits, programmable logic arrays, and other hardware devices can likewise be constructed to implement the methods and functions described herein. Further, the methods described herein may be implemented as a device, such as a non-transitory computer-readable storage medium or memory device, including instructions that when executed cause a processor to perform the methods and functions described herein.

In accordance with various embodiments, the methods and functions described herein, when implemented as software programs, provide a technical solution that allows to effectively and efficiently identify sentiments associated with aspects of an entity expressed in reviews, posts, blogs, tweets, or other opinionated documents. In addition, the technical solution disclosed herein further employs a clustering engine that groups similar aspects into hierarchical clusters at different levels, to allow an overall view of the sentiments or opinions for each subject or set of subjects related to certain products or services.

According to one embodiment, a computer-implemented aspect-based sentiment analysis application is provided in the disclosure, where the application is configured to perform certain data preprocessing and the following aspect and sentiment extraction by using a rule engine, machine learning approaches, or hybrid solutions. These different solutions, when implemented on a processor, may allow certain data normalization to be performed first and certain labeling and tagging of words or phrases to be performed next, as further described in detail in later sections. The information obtained from the labeling and/or tagging processes may be then used for effective aspect and sentiment extraction with high precision. In some embodiments, the rule-based approaches may be further used to identify an aspect-sentiment relationship between the extracted aspects and sentiment words.

In some embodiments, the machine learning solutions used by the application can be supervised and unsupervised, and the rules used by the rule engine in aspect-sentiment relationship identification can be predefined and/or dynamically updated based on the knowledge obtained from practice or experience.

In some embodiments, the aspect-based sentiment analysis application is also configured to perform certain aspect clustering. This includes grouping similar aspects into hierarchical clusters based on the context, as further described below in later sections.

The solution disclosed herein shows technical improvements when compared to other existing natural language processing (NLP)-based sentiment analysis methods. First, the solution disclosed herein organizes data in a way to allow better data mining in later processes. For example, by grouping different attributes of products/features into different clusters, it organizes the data in a way to allow data miners to segregate reviews in multiple dimensions facilitating the data miners to get meaningful insights from millions of reviews, which improves the efficiency in the later data mining process in sentimental analysis and/or decision making. Second, the solution disclosed herein improves the efficiency of sentiment analysis when compared to other existing sentiment analysis methods. For example, for rule-based aspect-sentiment relationship identification, as will be described later, the rules work on syntactically parsed sentences based on the relationships identified from the syntactic parsing, and thus has a very high precision when compared to other existing NLP-based methods. In addition, the rule-based approach is light and requires minimal computation power and thus saves the computation resources in NPL-based sentiment analysis. This is important especially when considering there is a huge number of reviews, posts, and the like during an analysis process. Further, the design and development time required for the system is greatly reduced as the rules are minimal while the system can still provide results with high precision. Moreover, in the disclosed solution, one set of rules can provide results for all the domains, although certain domain-specific rules can be also deployed as a wrapper around the base rules. In some embodiments, even language-specific rules may be deployed, which allows to extract syntactic relationships between aspects and sentiments in different languages.

It is to be understood that the benefits and advantages described herein are not all-inclusive, and many additional features and advantages will be apparent to one of ordinary skill in the art in view of the figures and the following descriptions.

OVERVIEW

FIG. 1 illustrates a high-level overview of an exemplary process 100 for aspect-based sentiment analysis with conceptual aspect clustering, according to some embodiments. As illustrated, the exemplary process 100 starts with data input 110, which may include opinionated documents, such as customer reviews, posts, tweets, and the like for a product, service, private or government entity, etc. The input data 100 or opinionated documents may include unorganized or unstructured text that comes from online sources such as emails, blog posts, support tickets, web chats, social medial channels, forums, and comments. In addition, the opinionated documents may contain a certain emotional tone behind a body of text, which, when properly analyzed, may offer insights for certain public and private companies, and organizations in decision-making and/or providing recommendations.

As illustrated in FIG. 1, a natural language processing (NLP)-based sentiment analysis application 120 may be applied to determine and/or categorize the emotional tone behind the body of text. Application 120 uses algorithms or other computational logic to replace manual data processing by implementing rule-based, machine-learning techniques, or hybrid methods. Rule-based algorithms or processing may perform sentiment analysis based on predefined, lexicon-based rules, while machine learning techniques may learn data through experience or practice. A hybrid sentiment analysis application may combine both approaches.

In the illustrated embodiment in FIG. 1, the NLP-based sentiment analysis application 120 includes three different components, a data preprocessing unit 122, a rule engine 124, and a clustering engine 126. The data preprocessing unit 122 may be configured to perform certain data preparation and/or preprocessing processes that include, but are not limited to, data normalization, syntactic parsing, and semantic role labeling, as illustrated in FIG. 1. The data normalization may relate to data standardization, which prepares data allowing it to be input into certain NLP systems or modules. Syntactic parsing may include automatic analysis of the syntactic structure of natural language, especially the syntactic relations or dependency relations between different words or phrases in opinionated documents. Semantic role labeling may include the assignment of labels to words or phrases in a sentence, which indicate their semantic roles (e.g., agent, goal, result, etc.) of the words or phrases in the sentence. In some embodiments, the data preprocessing unit 122 may include additional preprocessing processes not illustrated in FIG. 1, such as sentiment tagging, noun extraction, and so on, as will be described later.

The rule engine 124 is configured to perform aspect-based sentiment analysis based on the information obtained from data preprocessing. As illustrated in FIG. 1, the rule engine may perform sentiment mining, aspect mining, and aspect-sentiment relationship identification or determination, among other possible functions. The aspect mining may relate to identifying the aspects included in the opinionated documents, which may be carried out based on the information obtained from data preprocessing. For example, the information obtained through semantic role labeling may allow certain aspects to be identified. Similarly, sentiment mining may relate to identifying sentiment words (or simply sentiments) included in the opinionated documents. For example, certain sentiment tagging techniques used in data preprocessing may allow certain sentiments to be identified from opinionated documents.

In some embodiments, the identified aspects and sentiments may be not always related. For instance, certain aspects may not have associated sentiments in opinionated documents, and vice versa. The aspect-sentiment relationship identification or determination may allow the identification of the aspect-sentiment relationship between identified aspects and sentiments. In one example, certain rules may be used by the rule engine 124 to determine whether there is a relationship between identified aspects and sentiments. The rules may use information obtained through syntactic parsing (or information obtained through other data preprocessing) in relationship identification.

The clustering engine 126 is configured to further group the identified aspects and/or associated sentiments. This includes grouping aspects that share similar measures into a same category, cluster, or group. Aspect mining can produce an undesirably large number of aspects—with many of those relating to similar product features. Hence, aspect clustering becomes necessary. In some embodiments, the information obtained from the data preprocessing, e.g., information obtained from semantic role labeling, may be used in aspect clustering. In some embodiments, the aspect clustering may also use information obtained from aspect-sentiment relationship determination. In some embodiments, only aspects having the associated sentiments are clustered, and the aspects without associated sentiments are not included in the clustering process. In some embodiments, after aspect clustering, the outcome from NLP-based sentiment analysis application 120 may be output to a display terminal 130 for further data mining, e.g., for decision-making and/or recommendation.

Figure 2B:
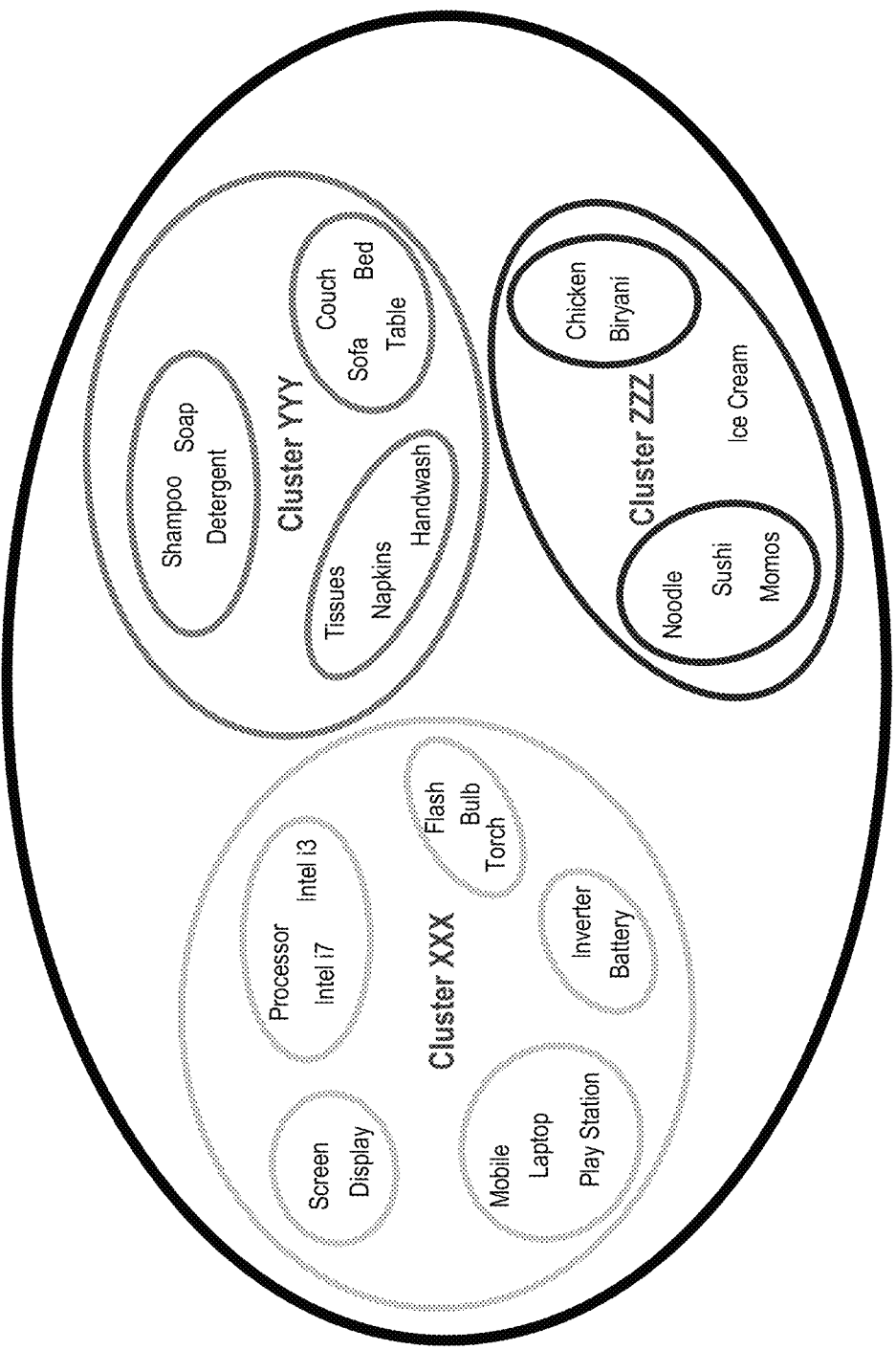
FIG. 2B illustrates an exemplary outcome of aspect-based sentiment analysis related to aspect clustering, according to some embodiments.

FIG. 2A illustrates an exemplary outcome of aspect-based sentiment analysis related to aspect extraction and aspect-sentiment relationship determination and FIG. 2B is an exemplary outcome of aspect-based sentiment analysis related to aspect clustering, according to some embodiments. In FIG. 2A, aspects identified from the input sentence include "app", "seamless experience", "keyless entry", "all parks", etc., and identified aspect-sentiment relationship includes "seamless" & "experience", "clearly" & "check", and "keyless" & "entry". In FIG. 2B, the identified aspects are clustered into three different clusters XXX, YYY, and ZZZ, each of which further includes one or more sub-clusters. It is to be noted, while the associated sentiments are not illustrated in FIG. 2B, in some embodiments, the associated sentiments may be included in these clusters and sub-clusters with or without additional clicks. In addition, in some embodiments, each cluster or subcluster may have a corresponding sentiment score, which allows one to easily get a general view of products or services from certain subjects. The clustered aspect sentiment pairs may thus provide an option to review the sentiments for different categories at a granular level.

Computer Implementation

Figure 3:
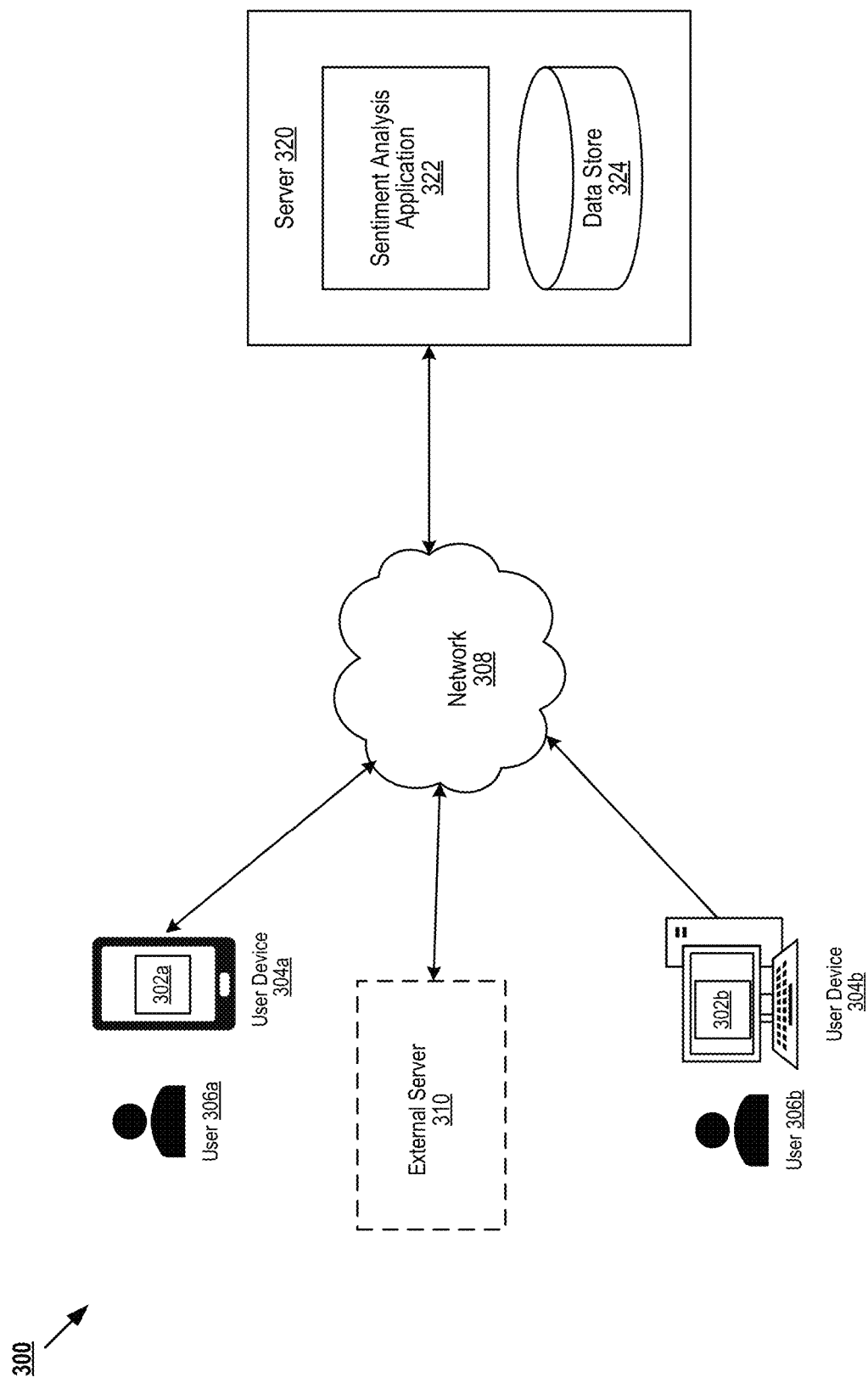
FIG. 3 illustrates an exemplary system architecture for aspect-based sentiment analysis, according to some embodiments.

FIG. 3 illustrates an exemplary system architecture for aspect-based sentiment analysis, according to some embodiments. By way of example and not limitation, various methods (e.g., process 100 in FIG. 1) provided in the disclosure may be executed, at least in part, by a software application 302 (e.g., 302a or 302b) running on a user device 304 operated by a user or customer 306, and/or by sentiment analysis application 322 running on a server 320. By way of example and not limitation, user device 304 can be a smartphone (e.g., user device 304a), a tablet, a personal computer (PC) (e.g., user device 304b), a laptop PC, etc. In some embodiments, user device 304 can be any suitable electronic device connected to a network 308 via a wired or wireless connection and capable of running software applications like software application 302. Software application 302 can be installed on user device 304 or be a web-based application running on user device 304. In one example, a software application is a social network application allowing users to input text and/or media, such as posting a comment, providing a review, responding to a survey, etc. In some embodiments, the software application may include multiple different applications that each have a different focus or are associated with a different entity. Users 306 accessing these applications 302 can be a person that intends to achieve a specific goal such as requesting a service, purchasing a product, conducting a transaction, providing feedback for a service, product, or a related business or organization, etc. In some embodiments, the information provided by user 306 may be transmitted by software application 302 from user device 304 to server 320 for aspect-based sentiment analysis.

Network 308 can be an intranet network, an extranet network, a public network, or combinations thereof used by software application 302 to exchange information with one or more remote or local servers, such as server 320 or external server 310. According to the illustrated embodiment, software application 302 can be configured to exchange information, via network 308, with servers (e.g., server 320 and external server 310) and other components that belong to system 300 or other systems similar to system 300 not shown in FIG. 3.

Server 320 includes hardware, software, and/or firmware configured to store, process, and analyze the information collected from user devices 304, via software application 302. Server 320 includes a sentiment analysis application 322 and an associated data store 324, where the sentiment analysis application 322 may further include a variety of modules and components for providing specific functions for sentiment analysis, as will be described later in FIG. 4. According to some embodiments, server 320 performs at least some of the operations discussed in the methods described herein (e.g., process 100 in FIG. 1). In some embodiments, server 320 can be a cloud-based server.

In some embodiments, server 320 may store data used and generated in performing the functionalities described herein in data store 324. Data store 324 may be categorized in different libraries (not shown). Each library stores one or more types of data used in implementing the methods described herein. By way of example and not limitation, each library can be a hard disk drive (HDD), a solid-state drive (SSD), a memory bank, or another suitable storage medium to which other components of the server 320 have read and write access.

External server 310 may be a third-party server that provides a platform for user 306 interaction with system 300. For example, the eternal server 310 may manage the software application 302 or other applications installed on different user devices 304. For example, the external server 310 may be configured to control the software application to collect and/or frequently (e.g., daily, weekly, monthly, etc.) transmit the user interactions with the software applications to server 320. In some embodiments, the user interaction data may be directly transferred from external server 310 to data store 324 associated with server 320, which can be a cloud store or a local store associated with the sentiment analysis application 322.

In some embodiments, the system 300 includes fewer or additional components than those illustrated in FIG. 3. For example, the system 300 may additionally include certain artificial intelligence (AI) engines and/or natural language processing components for supporting one or more functions of the system 300, as will be described in detail below.

Figure 4:
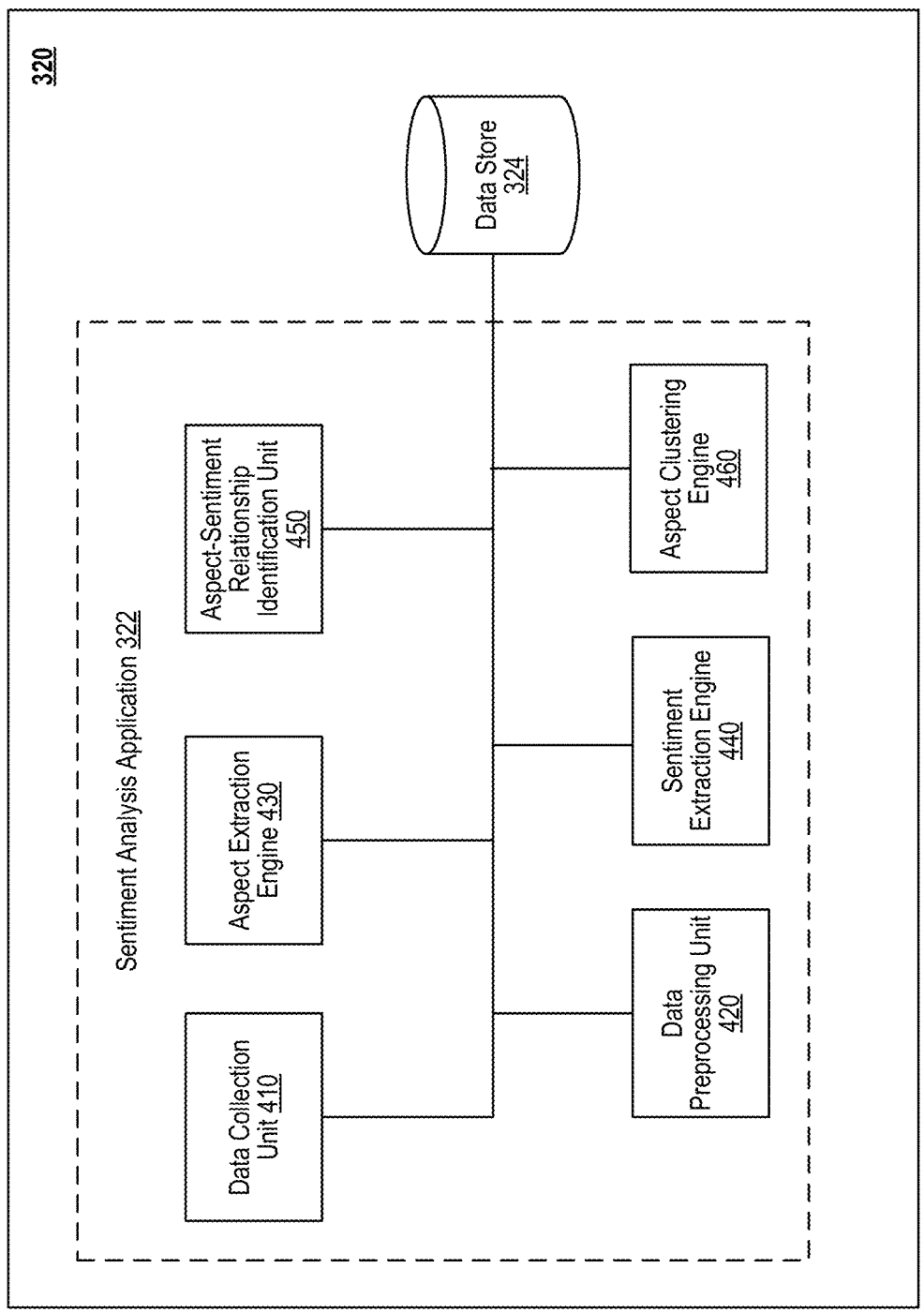
FIG. 4 is an exemplary block diagram illustrating components within a sentiment analysis application, according to some embodiments.

FIG. 4 illustrates exemplary components included in sentiment analysis application 322. According to the illustrated embodiment, the sentiment analysis application 322 of server 320 includes a data collection unit 410, a data preprocessing unit 420, an aspect extraction engine 430, a sentiment extraction engine 440, an aspect-sentiment relationship identification unit 450, and an aspect clustering engine 460. In some embodiments, sentiment analysis application 322 of server 320 may include only a subset of the aforementioned components or include at least one of the aforementioned components. Additional components may be present on other servers (e.g., external server 310) communicatively coupled to server 320. In some embodiments, the sentiment analysis application 322 is a cloud-based application (e.g., SaaS) that can be scaled up and down based on specific requirements.

Data collection unit 410 may be configured to collect data including user interaction with system 300, where the user interaction may include information submitted by users through the software applications provided to the users. The information may include data like customer reviews, blogs, survey responses, social media posts, and the like collected from different resources, e.g., from different software applications installed on user devices or through different third-party servers that manage social network platforms. In some embodiments, only text is collected by the data collection unit 410, although other media formats such as images, videos, and audio are included in the reviews, blogs, survey responses, social media posts, and so on. In some embodiments, the system 300 may include additional components that convert images, videos, audio, or other forms of information into text. Under such circumstances, images, videos, and audio can be then collected by the data collection unit 410.

Data preprocessing unit 420 may be configured to prepare the collected text for sentiment analysis, which may include certain text normalization and further processing including certain lexical analysis, syntactic parsing, and semantic analysis that facilitate the identification of sentiment, aspect, and the relationship therebetween. With respect to text normalization, the data preprocessing unit 420 may be configured to normalize the collected text to allow it to be used as input for the later sentiment analysis. For lexical analysis, the data preprocessing unit 420 may employ certain NLP processes for error corrections, such as the removal of duplicated words or missing words. With respect to syntactic parsing, the data preprocessing unit 420 may be configured to determine the syntactic or grammar structure of each sentence. With respect to semantic analysis, the data preprocessing unit 420 may be configured to derive the meaning of the sentence in question. The specific functions of the data preprocessing unit 420 are further described in detail below with reference to FIG. 5A.

FIG. 5A illustrates an exemplary data preprocessing process in preparation for sentiment analysis, according to some embodiments. The process may be implemented in the data preprocessing unit 420. According to one embodiment, data preprocessing for sentiment analysis may include text normalization 510, noun phrase extraction 520, lexicon-based sentiment tagging 530, semantic role labeling 540, and syntactic parsing 550. In some embodiments, operations 510-550 may be implemented according to the order illustrated in FIG. 5A. For example, text normalization 510 generally is the initial phase of the data preprocessing, and is done before other operations 520-550. In some embodiments, operations 510-550 may be implemented according to another different order. For example, instead of being implemented in parallel, one or more of the operations 520-550 may be implemented sequentially, that is, one operation may be implemented based on the information obtained from another.

For text normalization 510, it may include normalizing the text collected by the data collection unit 410 to reduce text randomness, bringing it closer to a predefined "standard." This helps reduce the amount of different information that the computer has to deal with, and therefore improves efficiency. In some embodiments, text normalization also reduces inflectional forms and sometimes derivationally related forms of a word to a common base form, as further described below.

In some embodiments, text normalization 510 may first include the removal of stop words, unstructured data, images, emoticons, vlogs, etc., prior to or after the above-described text normalization processes. For example, Twitter® allows individuals from any part of the world to post their perspectives as tweets in different languages. The information in these tweets may contain certain unstructured data such as stop words, non-English words, emphasis marks, and so on. Text normalization 510 at this point may include evaluating URLs, filtering and removing interrogative proclamations and stop words, removing unique characters, removing retweets, hashtags, emojis, pictures, dialects other than English (or another different language that is being analyzed), eliminating capitalized letter, and so on.

In some embodiments, certain additional text processing may be further applied to text normalization before sentiment analysis, which includes, but is not limited to, contraction expansion, tokenization, punctuation removal, stemming, lemmatization, etc. For contraction expansion, regular expressions are used to replace the contractions, e.g., "we will" is replaced with "we'll". In some embodiments, a dictionary containing all possible contractions may be generated and referred to for contraction expansion purposes. Tokenization is a process of segmenting text into sentences and/or words, that is, cutting a piece of text into multiple pieces called "tokens". For example, "I would not ask for another piece of information that has already been sent to me," can be cut into pieces of "'I', 'would', 'not', 'ask', 'for', 'another', 'piece', 'of', 'information', 'that', 'has', 'already', 'been', 'sent', 'to', 'me' '.'" Punctuation removal is a process of removal of any punctuation included in the text. For example, the dot at the end of the above sentence can be removed through the process. Stemming refers to a crude heuristic process of reducing words included in the text to their word stem or root form. For example, "expansion," "expanding." and "expanded" can be reduced to a common word "expand." Lemmatization usually refers to a process to remove inflectional endings only and to return the base or dictionary form of a word, which is known as "lemma." In some embodiments, stemming or lemmatization may be implemented by an additional plug-in component (e.g., algorithm).

Figure 5:
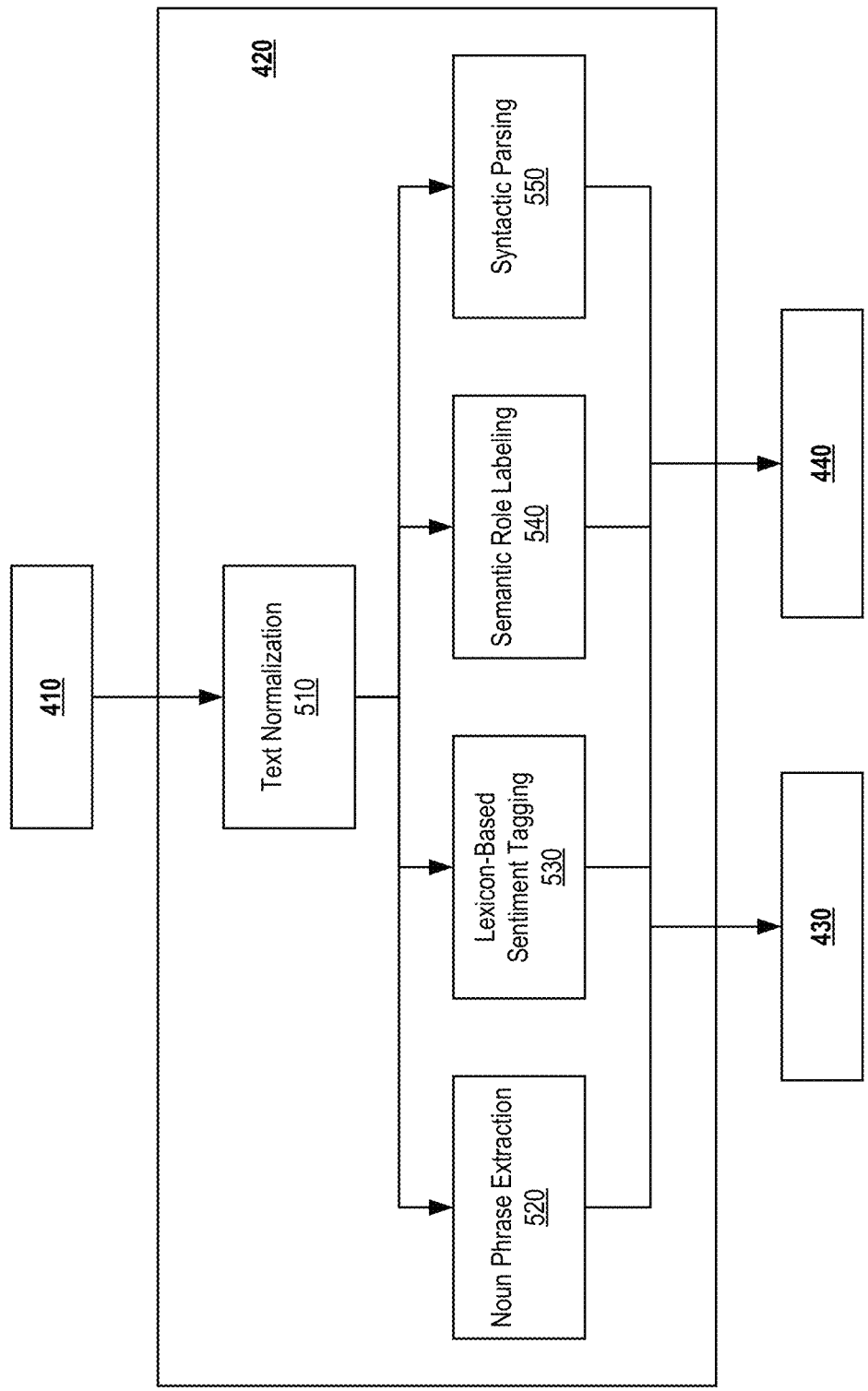
FIG. 5 illustrates an exemplary architecture of a data preprocessing unit within a sentiment analysis application, according to some embodiments.

In some embodiments, after text normalization, the collected text may be then subject to lexical analysis, syntactic parsing, and/or semantic analysis, which may specifically include noun phrase extraction 520, lexicon-based sentiment tagging 530, semantic role labeling 540, and syntactic parsing 550, according to the illustrated embodiment in FIG. 5.

For noun phrase extraction 520, it may include the identification of noun phrases from the preprocessed (e.g., normalized) text. Noun phrases are mostly contributed to the aspects identified from the reviews, blogs, surveys, and the like, and thus become an essential step for aspect-based sentiment analysis. Different techniques may be employed for noun extraction. In one example, in constituent parsing, an off-the-shelf constituent parser may be run to retrieve all noun phrase non-terminals from trees, where the syntax is used to restrict the extracted phrases to constituents such as noun phrases. Unlike verbs, prepositional or adjective phrases, noun phrases often make sense even when stripped from their surrounding text, and thus the syntax can be restricted to noun phrases in constituent parsing. In another example, part-of-speech (POS) tags or patterns may be employed to identify and extract noun phrases. A POS tag is a special label assigned to each token (or word) in a text corpus to indicate the parts of speech (e.g., N for noun, V for verb, A for adjective, etc.) and certain other grammatical categories including tense, number (plural/singular), voice, case, etc. POS tags can thus be used in corpus searches and in text analysis tools and algorithms to distinguish between the occurrences of a word when used as a noun, verb, or other different formats, and thus can be an effective tool in noun phrase extraction 520. In some embodiments, additional approaches for noun extraction are also possible and contemplated by the disclosure.

In some embodiments, in preparation for sentiment analysis, certain clean-up processes may be further implemented after noun phrase extraction. For example, after applying the noun word extraction techniques, all of the nouns in the pieces of text may be extracted. However, there are a lot of noun words that are not aspects, and thus may be not interesting for further aspect-based sentiment analysis. In addition, some of these nouns do not have associated sentiment words, which will not provide information for sentiment analysis either. Certain noun words identified using noun word extraction techniques are thus to be removed after the noun phrase extraction 520.

In some embodiments, different refining techniques may be used to further remove nouns that are not aspects-related and/or sentiment-associated. In one example, the named entity extraction technique can be used to automatically extract terms of a specific type, such as names of people, organizations, locations, times, quantities, monetary values, percentages, and more. The named entity extraction technology can achieve this by first recognizing the nouns and then categorizing these nouns, which can be done through machine learning and natural language processing. For instance, entity categories can be manually created and a named entity recognition model may be then fed with relevant training data. By tagging word and phrase samples with corresponding entities (e.g., corresponding categories), the named entity recognition model can be trained and then used to identify only certain categories but no other irrelevant nouns. For example, a trained named entity recognition model can be used to organize all customer feedback and pinpoint recurring problems. In one specific application, a trained named entity recognition model can be used to detect locations that are mentioned most often in negative customer feedback, which might lead a resolution team to specifically focus on a particular office branch. Therefore, by properly training a named entity recognition model, it allows only relevant nouns to be recognized, and any irrelevant nouns (e.g., nouns that are not aspect-related) can be then removed or filtered out. In some embodiments, other different approaches may be also used to remove certain noun words that are not aspects-related and/or sentiment-associated.

For lexicon-based sentiment tagging 530, the focus of the data preprocessing is to automatically determine whether a text leaves a positive, negative, or neutral impression. Before purchasing a product, people often search for reviews online to help them decide if they want to buy it. These reviews usually contain expressions that carry so-called emotional valence, such as "great" (positive valence) or "terrible" (negative valence), leaving readers with a positive or negative impression. Lexicon-based sentiment tagging thus can be used to analyze the sentiment of customer feedback on brands, products, and services found in online reviews or on social media platforms.

In lexicon-based sentiment tagging 530, words in texts can be labeled as positive, negative, or neutral with the assistance of certain lexicon-based classifications. Every language has its own vocabulary, but every language provides a unique grammatical mechanism for combining its stock of words to express an open-ended range of concepts. A lexicon is considered as a bridge between a language and the knowledge expressed in that language. For lexicon-based sentiment analysis, it can be either dictionary-based or corpus-based. For the dictionary-based approach, a dictionary of positive and negative words is created from an initial set of words by including synonyms and antonyms. For the corpus-based approach, the library is obtained from an initial set by using statistical techniques. Once the library is created, it can be used for lexicon-based sentiment tagging. For example, each word in a document can be compared against the list of positive and negative words and assigned a sentiment tag. Take the sentence "good stores sometimes have bad products" as an example, in lexicon-based sentiment tagging 530, the data preprocessing unit 420 may follow the created library to label the word "good" as positive, the word "bad" as negative, and the other words as likely neutral.

In some embodiments, after the lexicon-based sentiment tagging for each word, the data preprocessing unit 420 may further generate an overall sentiment score by counting the numbers of positive and negative words and combining these values mathematically. If the sentiment score is negative, the text is classified as negative. It follows that a positive score means a positive text, and a score of zero means the text is classified as neutral. In some embodiments, the words that are not marked as either positive or negative can be removed from later processing, since they will not contribute to the sentiment analysis.

For semantic role labeling 540, the data preprocessing unit 420 may be configured to assign labels to words or phrases in a sentence that indicate their semantic roles in a sentence. To do this, the data preprocessing unit 420 may detect the arguments associated with the "predicate" (or verb) of a sentence and how they are classified into their specific roles. In linguistics, "predicate" refers to the main verb in a sentence, and the words accompanying the predicate are referred to as "arguments". The objective of semantic role labeling is to determine how arguments are semantically related to the predicate. For example, for the sentence "Mary loaded the truck with hay at the depot on Friday", "loaded" is the predicate, "Mary" "truck" and "hay" have respective semantic roles of a loader, bearer, and cargo. Additional roles in the sentence include a location (depot) and time (Friday). The objective of semantic role labeling 540 is to identify these roles so that downstream natural language processing tasks (e.g., aspect-sentiment relationship identification) can "understand" the sentence. Some exemplary semantic roles that can be identified from sentences include, but are not limited to, agent, patient, experiencer, force, theme, result, content, instrument, beneficiary, source, goal, location, etc.

In some embodiments, different approaches such as the rule-based approach or artificial intelligence-based approach may be used for semantic role labeling. For a rule-based approach, certain rules may be derived from grammar, which can be used to label semantic roles for words in a sentence. In one example, using heuristic rules, data preprocessing unit 420 may discard certain constituents that are unlikely arguments. For an artificial intelligence-based approach, a classifier trained from feature sets may be used. The feature sets used for the training may include predicate, constituent phrase type, headword, and its POS, predicate-constituent path, voice (active/passive), constituent position (before/after predicate), etc. In some embodiments, neural network approaches may be also used, which includes using dependency parsing for intermediate representations, or directly capturing semantic annotations using an encoder-decoder architecture without requiring dependent parsing. In some embodiments, other supervised and unsupervised approaches may be also possible for semantic role labeling.

Figure 6A:
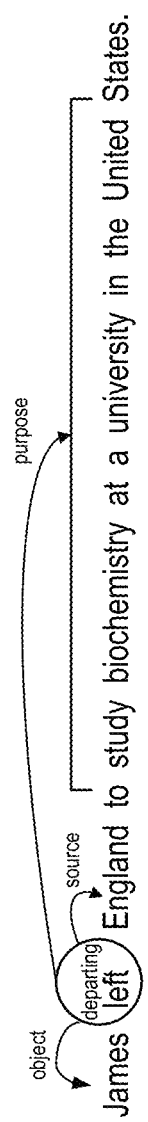
FIG. 6A illustrates an exemplary outcome of semantic role labeling of a sentence, according to some embodiments.

FIG. 6A illustrates an example outcome of semantic role labeling 540, according to some embodiments. In the sentence illustrated in the figure, the predicate (or verb) is "leave", the object of "leave" is "James", the source from where he left is "England", and the purpose of leaving is to "study biochemistry at a university in the United States.

Referring back to FIG. 5, for syntactic parsing 550, the data preprocessing unit 420 may be configured to analyze the syntactic structure of the normalized text, especially syntactic relations and labeling spans of constituents. The word "syntax" refers to the grammatical arrangement of words in a sentence and their relationship with each other. The objective of syntactic analysis is to find the syntactic structure of a sentence which is usually depicted as a tree. Identifying the syntactic structure such as syntactic relations and labeling spans of constituents is useful in determining the meaning of a sentence.

In some embodiments, different theories of grammar may be employed to propose different formalisms for describing the syntactic structure of sentences. According to one example, constituency grammars or dependency grammars may be used for syntactic parsing, where constituency grammar-based parsing (also referred to as "constituency parsing") may be used to determine the labeling spans of constituents while dependency grammar-based parsing (also referred to as "dependency parsing") may be used to determine the syntactic relations between words in a sentence. Specifically, for constituency parsing, the process may include a determination of which spans are constituents (e.g., [The man] is here) and what kind of constituent it is (e.g., [The man] is a noun phrase) on the basis of a context-free grammar that encodes rules for the constituent formation and merging (e.g., [The man]). Dependency parsing, on the other hand, is a process for assigning a head to each token and a corresponding dependency relation for each edge, resulting in an eventual construction of a tree or graph over a whole sentence.

Figure 6B:
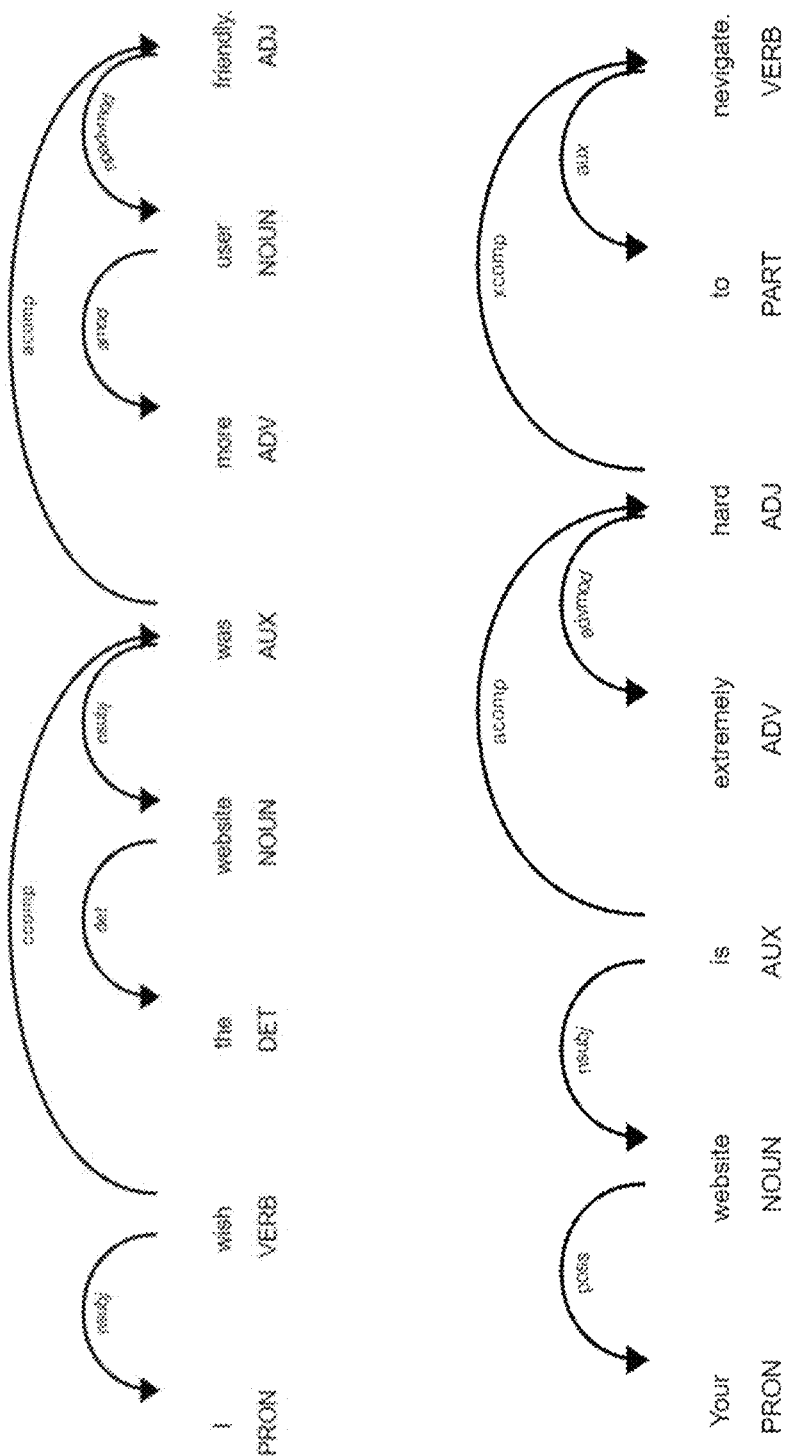
FIG. 6B illustrates an exemplary outcome of syntactic parsing of two sentences, according to some embodiments.

FIG. 6B illustrates two exemplary trees or graphs that include the identified syntactic relationships through dependency parsing. In each graph, the word under each curve indicates a syntactic relationship between two linked words, which generally is a binary grammatical relation between a governor (also known as a "regent" or "head") and a dependent. Currently, there are approximately 50 grammatical relations identifying syntactic relationships between words in sentences, which include, but are not limited to, acomp, advcl, agent, amod, appos, aux, auxpass, cc, ccomp, conj, cop, csubj, csubjpass, dep, det, discourse, dobj, expl, goeswith, iobj, mark, mwe, neg, nn, npadvmod, nsubj, sjubjpass, num, number, parataxis, pcomp, pobj, poss, possessive, preconj, predet, prep, prepc, prt, punct, quantmod, rcmod, ref, root, tmod, vmod, xcomp, xsubj, etc. In the illustrated examples in FIG. 5B, "nsubj" indicates a nominal subject relationship between "wish" and "I", "was" and "website", and "is" and "website". In the illustrated two sentences, "comp" "det" "acomp" "amod" "npadvmod" "poss" "advmod" "xcomp" and "aux" also indicate respective syntactic relationships between the associated word pairs (or the linked words).

In some embodiments, additional data preprocessing processes or techniques facilitating the aspect and sentiment extractions can be also possible and included in the data processing unit 420. For example, while not illustrated, the data preprocessing unit 420 may be configured to perform certain general sentiment analysis operations, including but not limited to, determining the semantic meaning of each word or phrase, among others.

Referring back to FIG. 4, in some embodiments, the sentiment analysis application 322 may further include an aspect extraction engine 430 configured to identify aspects from the text preprocessed by the data preprocessing unit 420. This includes extracting opinion phrases that include one or more aspects and associated opinions. Here and throughout the specification, "aspect" generally refers to a property of an entity that can be opinionated by a user (an aspect may thus also be referred to as "opinion target"). For example, if an entity is a restaurant, the aspects that can be evaluated may include the restaurant's ambiance, food, service, and so on. For another example, if an entity is a product manufacturer, the aspects may include features and attributes related to products.

In some embodiments, the information obtained from data preprocessing may be used for aspect extraction. For example, during noun phrase extraction, certain nouns that are not aspects or aspect-related can be removed using different refining techniques like the named entity extraction technique, which then allows the remaining aspects to be extracted from opinionated documents.

In some embodiments, aspect extraction is performed based on the syntactic relationship of a token as well as the semantics of a token. In one example, for the sentence "the phone takes a good picture", if "good" is a known opinion word (given or extracted), "picture" (a noun modified by "good") is clearly an aspect as the two words have a dependency relation amod based on the information obtained from the syntactic parsing. However, for some sentences, such a dependency relation does not exist. At this point, the semantic meaning of a token can be used for aspect extraction. For example, for the sentence "the phone is good, but not its photo", "photo" may be not extracted if the extraction is performed just based on the dependency relation. However, by considering the semantic fact that "photo" is a synonym of "picture", "photo" can be extracted based on the semantic similarity of the two words. In some embodiments, the aspect extraction engine 430 is configured to learn from the experience (e.g., from aspect-extracting a lot of phone reviews about pictures or photos), and thus is able to extract "photo" based on the semantic similarity between "photo" and "picture".

In some embodiments, different artificial intelligence-based techniques can be applied to extract different aspects from opinionated documents. These different extraction techniques can be generally classified into supervised, semi-supervised, or unsupervised approaches. For supervised aspect extraction, labeled data is used to extract aspects in the training phase, where the labeled data can be annotated by human using certain annotation tools, for example, a web-based annotation tool (e.g., brat) for adding fixed-form notes to existing documents that can be automatically processed and interpreted by a computer. For semi-supervised aspect extraction, a model or algorithm may be trained in a certain limited context. For example, a recurrent neural network (RNN) may be trained in a limited context, which can be then used for semantic-based or lexicon-based aspect extraction. For unsupervised aspect extraction, unannotated data is used to extract aspects without requiring first training a model or algorithm. For example, an unsupervised deep neural network may be configured in the aspect extraction engine 430 to classify a set of sentences by their aspects.

It is to be noted that there are generally two types of aspects defined in aspect-based sentiment analysis: explicit aspects and implicit aspects. Explicit aspects generally refer to words that explicitly denote the opinion targets in the opinionated documents, while implicit aspects generally refer to a concept that represents an opinion target of an opinionated document but which is not specified explicitly in the document. For example, in the opinionated text "the resolution of my tablet is superb, "resolution" is an explicit aspect, while in the opinionated text "this tablet is very affordable," "price" is an implicit aspect. While the above-described approaches may work well for explicit aspect extraction, for implicit aspect extraction, these approaches may not perform well or have certain limitations.

In some embodiments, to better extract implicit aspects, the aspect extraction engine 430 disclosed herein may attach word embedding as the features of each token during aspect extraction. Word embedding is a text vectorization technique that converts words to vectors of continuous real numbers. Each word dimension in the embedding vector represents a latent feature of this word. Accordingly, these converted vectors inherently encode linguistic regularities and patterns. In some embodiments, to allow encoding linguistic regularities and patterns, a model used in word embedding can be trained based on a global word-word co-occurrence matrix. In other embodiments, each word can be represented by a bag of character Ngrams. This then allows to compute word representations for words that did not appear in the training dataset, thereby allowing extraction of implicit aspects.

In some embodiments, other different approaches not described above may be also implemented in the aspect extraction engine 430 for extracting explicit and implicit aspects from opinionated documents. For instance, techniques like a few short learning and fuzzy matching may be used to tag product details to improve aspect extraction.

Referring back to FIG. 4, the sentiment analysis application 322 further includes a sentiment extraction engine 440 configured for sentiment extraction. In some embodiments, the information obtained from the lexicon-based sentiment tagging can be used for sentiment extraction, as described earlier with reference to lexicon-based sentiment tagging operation 530. That is, the sentiments tagged during the data preprocessing process may allow a direct extraction of sentiments.

Continuing with FIG. 4, in some embodiments, the sentiment analysis application 322 further includes an aspect-sentiment relationship identification unit 450 configured to identify the aspect-sentiment relationships between the extracted aspects and sentiments. In some embodiments, the aspect-sentiment relationship identification unit 450 may be configured to identify the aspect-sentiment relationship based on the syntactic-based rules to get the relationship between aspect and sentiment. The specific structure and functions of the aspect-sentiment relationship identification unit 450 are further described below with reference to FIGS. 7A-7B.

Figure 7A:
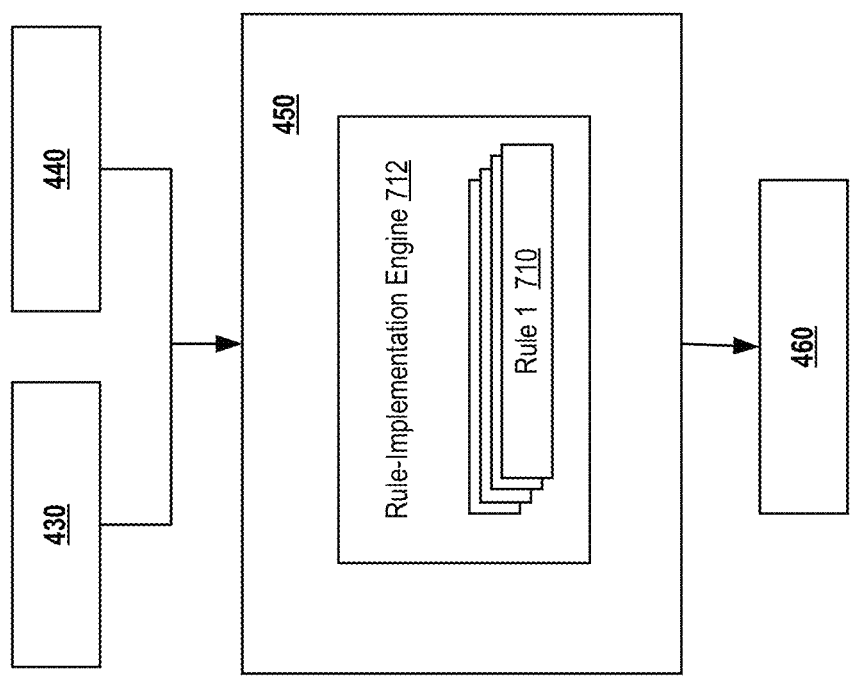
FIG. 7A illustrates an exemplary architecture of a rule-implementation engine, according to some embodiments.
Figure 7B:
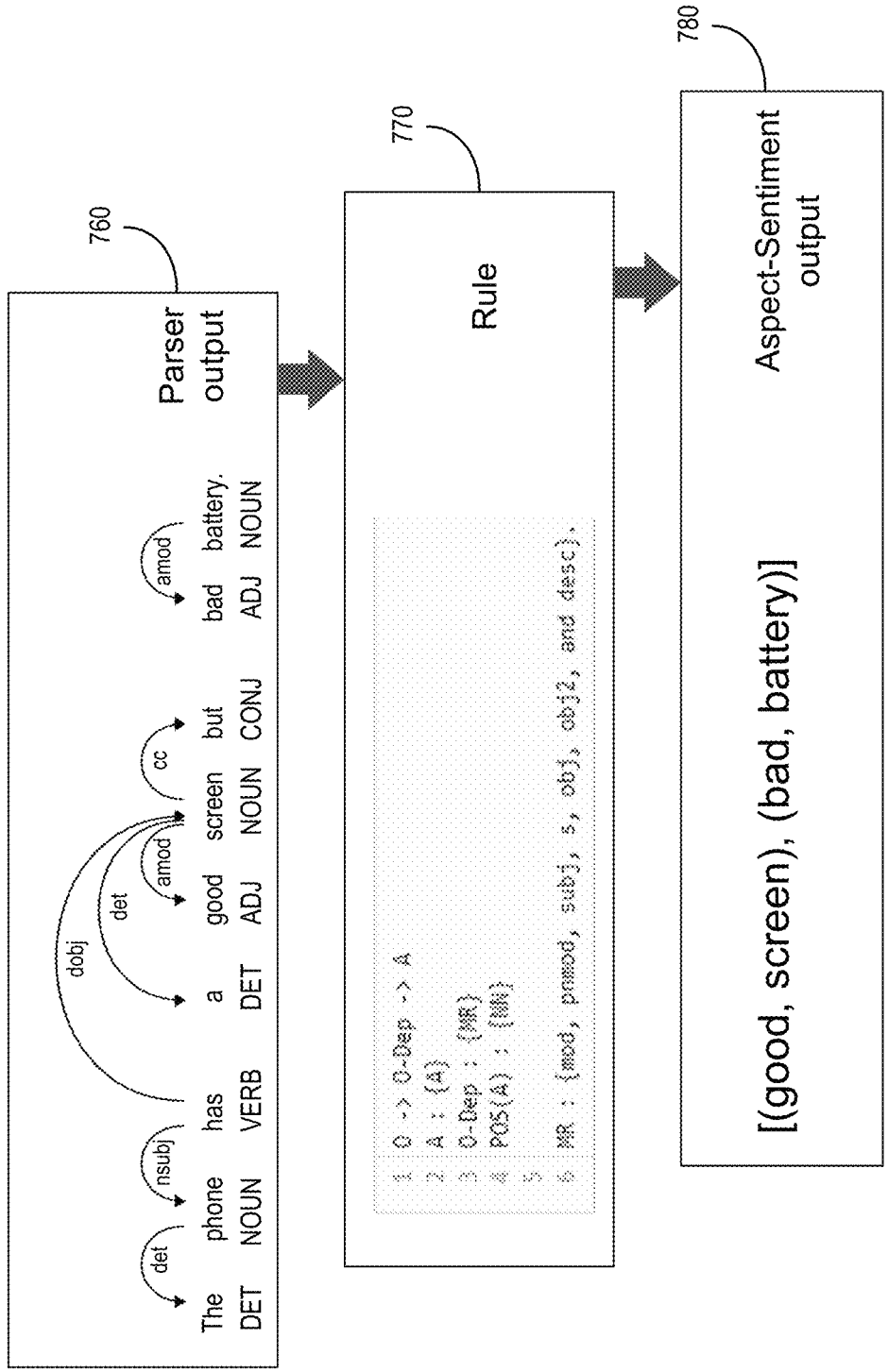
FIG. 7B illustrates an exemplary operation of a rule-implementation engine, according to some embodiments.

FIG. 7A illustrates an exemplary architecture of an aspect-sentiment relationship identification unit 450, and FIG. 7B illustrates an exemplary operation performed by the aspect-sentiment relationship identification unit 450, according to some embodiments. As illustrated in FIG. 7A, the aspect-sentiment relationship identification unit 450 may include a set of rules 710 for identifying the aspect-sentiment relationship and a rule-implementation engine 712 for implementing one or more of the rules 710.

According to one embodiment, the rule-implementation engine 712 may be configured to determine that there is an aspect-sentiment relationship when a specific condition is satisfied. The input used for comparison may include a result from syntactic parsing (also referred to as "parser output"), as illustrated in FIG. 7B. The parser output may include certain dependency relations between words in an opinionated document. For example, for a sentence "the phone has a good screen but bad battery", syntactic parsing may identify a set of dependency relations as shown in block 760 in FIG. 7B. These different dependency relations may be then input into the rule-implementation engine 712 for comparison. For example, the rule-implementation engine 712 may check each dependency relation against the set of rules 710, and determine whether one or more rules satisfy. If the dependency relation satisfies at least one rule, the rule-implementation engine 712 may determine that the word pair or linked words associated with the dependency relation have an aspect-sentiment relationship.

FIG. 7B illustrates one exemplary rule 770 that can be used to identify an aspect-sentiment relationship. In the rule, "O" represents an opinion word or sentiment word, and "A" represents an aspect word. According to rule 770, if an aspect word is a noun and there exists a dependency relation between the aspect and a sentiment word, then there is an aspect-sentiment relationship between the associated word pair. Rule 770 also states that the dependency relation should be one selected from the relation set: {mod, pmod, subj, s, obj, obj2, desc}, as illustrated in FIG. 7B. Based on the rule, it can be seen that while there are three nouns and there are six dependency relations between the three nouns with other words in the sentence, only dependency relations for "good" & "screen" and "bad" & "battery" have a relationship that belongs to the relation set {mod, pmod, subj, s, obj, obj2, desc}. Therefore, "good" & "screen" and "bad" & "battery" are determined to have an aspect-sentiment relationship based on rule 770. Accordingly, the rule-implementation engine 712 outputs the two-word pairs, as illustrated in block 780 in FIG. 7B.

In some embodiments, other additional rules may also be used to identify aspect-sentiment relationships between different aspects and sentiments. FIG. 7C illustrates a list of exemplary rules that can be implemented by the rule-implementation engine 712 in identifying the aspect-sentiment relationships from the word pairs. The inputs for these different rules may also come from the parser output that includes dependency relations identified from an opinionated document.

Referring back to FIG. 4, in some embodiments, the sentiment analysis application 322 further includes an aspect clustering engine 460 configured to perform an aspect-based clustering. For example, the aspect clustering engine 460 may be configured to group aspects that have no predefined class labels based on the similarity measures between aspects extracted from the aspect extraction process.

In actual applications, the sentiment analysis application 322 may receive reviews containing hundreds to thousands of different aspects, for example, reviews collected from Amazon®, Walmart®, Twitter®, and the like. Among these different aspects, many may be grouped together based on the similarity measures. For example, aspects like butter, cheese, yogurt, milk, and the like can be clustered into the category of "dairy products", aspects like payment, amount, refund and the like can be clustered into the category of "transactions", and aspects like website, navigation, software and the like can be clustered into the category of "online". The aspect clustering engine 460 disclosed herein is configured to implement such clustering of these different aspects into the corresponding categories.

In some embodiments, the aspect clustering engine 460 may be configured to cluster different aspects based on the word embedding features, or based on the information obtained from the semantic role embedding process. As described earlier in FIG. 5, semantic role labeling is a process that assigns labels to words or phrases in a sentence that define their semantic roles like agent, patient, experiencer, force, theme, result, content, instrument, beneficiary, source, goal, location, etc., which allows to better understand the opinionated documents. Accordingly, the aspect clustering engine 460 may look into the semantic role labeling, and group two aspects that have similar semantic roles into a same cluster.

Figure 8A:
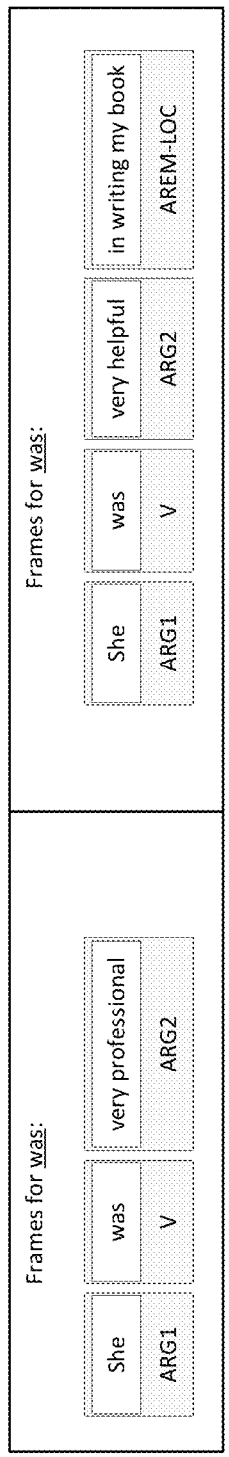
FIG. 8A illustrates an example similarity comparison between two aspects, according to some embodiments.

For example, agent behavior may have chunks like "very helpful", "very professional", "friendly", etc. Semantic role labeling may label them into one frame and give a similar role to them. When aspect clustering engine 460 identifies such labeling as having a similar role, the aspect clustering engine 460 may group them into a same cluster. FIG. 8A illustrates two example sentences with semantic role labeling. The two illustrated sentences have high similarity in frame name, sentence structure, and role labels. For example, "very professional" and "very helpful" were given role "attribute" (as an implicit aspect) as mentioned ARG2 in FIG. 8A. Due to the identified similarities, the two aspects can be then grouped together as a cluster. In some embodiments, the aspect clustering engine 460 may similarly group other reviews into clusters.

Figure 8B:
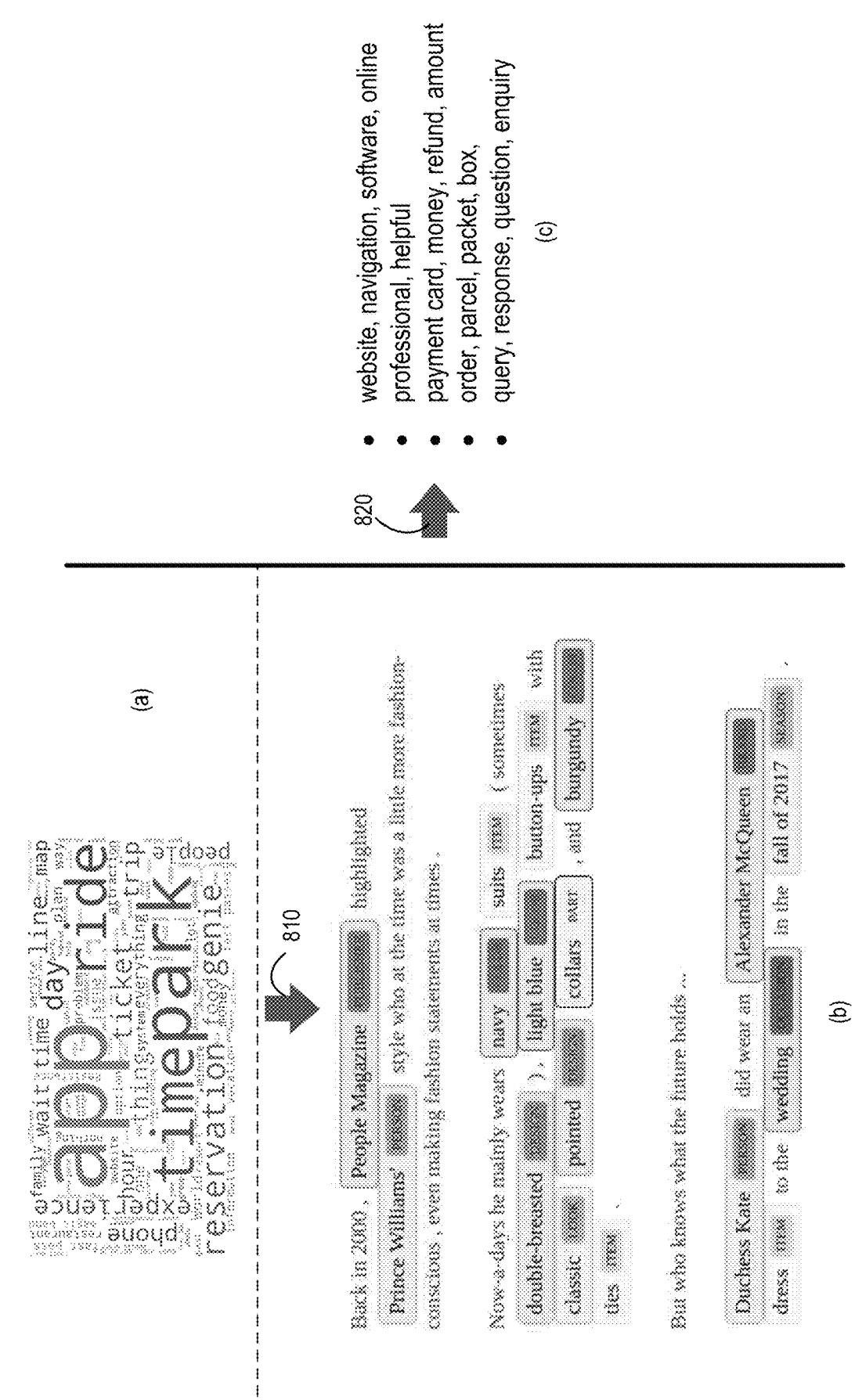
FIG. 8B illustrates an overall process for rule-based aspect clustering, according to some embodiments.

FIG. 8B illustrates an exemplary overall process for aspect-based clustering, according to some embodiments. Part (a) of FIG. 8B illustrates exemplary aspects (e.g., park, app, reservation, ticket, etc.) extracted from reviews collected from certain sources, e.g., from Amazon®. Arrow 810 indicates a semantic role labeling process. Part (b) illustrates exemplary semantic role labeling for the extracted aspects and/or associated sentiments. Arrow 820 indicates a semantic role labeling-based aspect clustering process. Part (c) illustrates exemplary clusters for various aspects extracted from the reviews.

It is to be noted that the samples provided in each Part (a)-Part (c) are merely illustrative and for exemplary purposes, as these samples may be not directly related to each other, as can be seen from the actual content in FIG. 8B. It is also to be noted that, while only aspects are illustrated in Part (c) of FIG. 8B, in some embodiments, the sentiments associated with respective aspects may be also grouped into the corresponding clusters. In addition, in some embodiments, the aspect clustering engine 460 may also group some features to certain sub-clusters within a cluster, as illustrated in FIG. 2B.

Process

Figure 9:
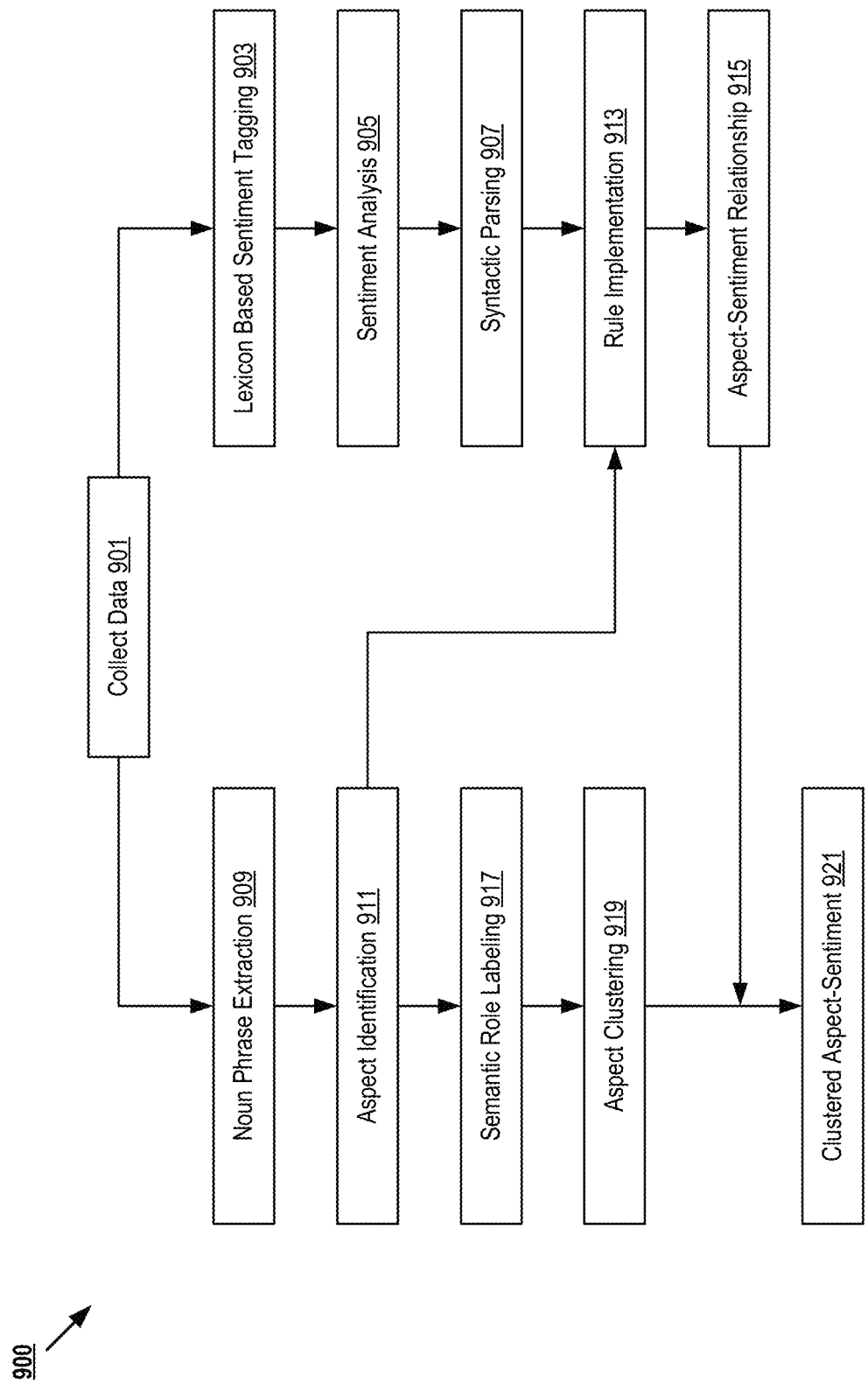
FIG. 9 is a flowchart of an exemplary method for aspect-based sentiment analysis with conceptual aspect clustering, according to some embodiments.

FIG. 9 is a flowchart illustrating an exemplary method 900 performed by the sentiment analysis application, according to some embodiments. Method 900 starts with data collection at step 901. The data may be collected from opinionated documents, such as reviews, posts, tweets, and the like from one or more sources. Method 900 may follow two different pathways, one focused on sentiment extraction and/or sentiment analysis, and the other focused on aspect extraction and clustering. Along the first pathway for sentiment extraction and/or sentiment analysis, method 900 continues with a lexicon-based sentiment tagging process 903, which identifies sentiment words or opinion words in opinionated documents. Method 900 then performs a sentiment analysis 905, which includes determining the identified sentiments as neutral, positive, or negative. In some embodiments, certain sentiment scores may be also assigned to each identified sentiment word or phrase. At step 907, syntactic parsing is then performed. This includes identifying syntactic relations such as dependency relations between different words.

Before performing rule-based aspect-sentiment relationship identification (at step 913) along the first pathway, method 900 may follow the second pathway to extracting aspects from the opinioned documents. Along the second pathway, method 900 first identifies nouns from the opinioned documents through a noun phrase extraction process 909. Method 900 then identifies aspects from nouns through aspect identification 911. This includes identifying implicit aspects and explicit aspects. After aspect identification, method 900 then performs a rule-based implementation for aspect-sentiment relationship identification at step 913, which is also a step along the first pathway. To achieve this, a rule-implementation engine may first filter out dependency relations that are irrelevant to the identified aspects (e.g., word pairs that do not include an aspect word). The rule-implementation engine then compares the remaining word pairs to one or more rules included in the engine, to determine whether a word pair has an aspect-sentiment relationship or not. The identified pairs having an aspect-sentiment relationship (indicated by block 915) may be then output from the rule-implementation engine.

As also illustrated in FIG. 9, in some embodiments, method 900 may further perform an aspect clustering process. Specifically, after aspect identification at step 911, method 900 may further perform a semantic role labeling 917, to label the semantic role of each phrase identified from the aspect identification 911 (the other non-aspect words or phrases may be also labeled). The semantic role labeling 917 allows to better understand the opinionated documents, including the context surrounding the aspects. Next, an aspect clustering process 919 is then performed based on the outcome of the semantic role labeling 917. For example, the aspects that share similar semantic roles may be grouped into a same cluster. In this way, the different aspects may be grouped into different categories as indicated by block 921 in FIG. 9, which allows to specifically understand the sentiments within each category.

It is to be noted that the procedure illustrated in FIG. 9 is merely for illustrative purposes but not for limitation. In some embodiments, method 900 may include more or fewer steps than those illustrated in FIG. 9, or may be implemented according to another different order. For example, the aspect identification 911 may be performed based on information obtained from semantic role labeling 917, but not from the noun phrase extraction 909 as illustrated in FIG. 9. For another example, sentiment analysis 905 may be performed after, but not before rule implementation 913 as illustrated in FIG. 9. However, these different variations of implementation do not necessarily affect the aspect-based sentiment analysis with a contextual grouping of different aspects.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described in the figures above. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field-programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" "(SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content." "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing." "computing." "calculating." "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled." however, may also mean that two or more elements are not in direct contact with each other, but yet still co-operate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for aspect-based sentiment analysis, comprising:
   a processor; and
   a memory, coupled to the processor, configured to store executable instructions that, when executed by the processor, cause the processor to:
      receive a collection of textual data including unorganized or unstructured text from online sources;
      perform a text normalization process to convert the unorganized or unstructured text into standardized data for sentiment analysis;
      extract a set of aspects and a set of sentiment words from the textual data;
      identify a set of aspect-sentiment word pairs from the extracted aspects and sentiment words, wherein each of the set of aspect-sentiment word pairs includes an aspect word from the set of aspects and a sentiment word from the set of sentiment words;
      identify a subset of aspect-sentiment word pairs according to a set of predefined rules, wherein each of the subset of aspect-sentiment word pairs is determined to have an aspect-sentiment relationship according to the set of predefined rules, wherein the subset of aspect-sentiment word pairs are identified by comparing each of the set of aspect-sentiment word pairs to the set of predefined rules, and determining that an aspect-sentiment word pair has the aspect-sentiment relationship when the aspect-sentiment word pair satisfies one or more of the predefined rules; and
      group a plurality of aspects associated with the subset of aspect-sentiment word pairs into one or more clusters.

2. The system of claim 1, wherein, prior to extracting the set of aspects and the set of sentiment words from the textual data, the instructions when executed by the processor further cause the processor to:
   perform one or more of a noun phrase extraction process, a lexicon-based sentiment tagging process, a semantic role labeling process, or a syntactic parsing process on the textual data.

3. The system of claim 2, wherein, to extract the set of aspects from the textual data, the instructions when executed by the processor further cause the processor to:
   extract the set of aspects from the textual data based on information obtained from one or more of the noun phrase extraction process or the semantic role labeling process.

4. The system of claim 2, wherein, to extract the set of sentiment words from the textual data, the instructions when executed by the processor further cause the processor to:
   extract the set of sentiment words based on information obtained from the lexicon-based sentiment tagging process.

5. The system of claim 2, wherein, to identify the set of aspect-sentiment word pairs, the instructions when executed by the processor further cause the processor to:
   identify the set of aspect-sentiment word pairs based on information obtained from the syntactic parsing process of the textual data.

6. The system of claim 2, wherein, to compare each of the set of aspect-sentiment word pairs to the set of predefined rules, the instructions when executed by the processor further cause the processor to:

compare each of the set of aspect-sentiment word pairs to the set of predefined rules based on information obtained from the syntactic parsing process of the textual data.

7. The system of claim 6, wherein the information obtained from the syntactic parsing process of the textual data comprises a syntactic relation between aspect and sentiment word included in each of the set of aspect-sentiment word pairs.

8. The system of claim 7, wherein, to compare each of the set of aspect-sentiment word pairs to the set of predefined rules, the instructions when executed by the processor further cause the processor to:
   compare the syntactic relation between aspect and sentiment word included in each aspect-sentiment word pair to the set of predefined rules.

9. The system of claim 2, wherein, to group the plurality of aspects associated with the subset of aspect-sentiment word pairs into the one or more clusters, the instructions when executed by the processor further cause the processor to:
   group the plurality of aspects associated with the subset of aspect-sentiment word pairs into the one or more clusters based on information obtained from the semantic role labeling process.

10. The system of claim 1, wherein the set of predefined rules are domain-nonspecific.

11. The system of claim 1, wherein the one or more clusters comprise a set of hierarchical clusters at different levels.

12. A system for aspect-based sentiment analysis, comprising:
   a processor; and
   a memory, coupled to the processor, configured to store executable instructions that, when executed by the processor, cause the processor to:
      receive a collection of textual data including unorganized or unstructured text from online sources;
      perform a text normalization process to convert the unorganized or unstructured text into standardized data for sentiment analysis;
      perform a semantic role labeling process on the textual data;
      extract a set of aspects and a set of sentiment words from the textual data;
      identify a set of aspect-sentiment word pairs from the extracted aspects and sentiment words, wherein each of the set of aspect-sentiment word pairs includes an aspect word from the set of aspects and a sentiment word from the set of sentiment words;
      identify a subset of aspect-sentiment word pairs according to a set of predefined rules, wherein each of the subset of aspect-sentiment word pairs is determined to have an aspect-sentiment relationship according to the set of predefined rules; and
      group a plurality of aspects associated with the subset of aspect-sentiment word pairs into one or more clusters based on information obtained from the semantic role labeling process.

13. A computer-implemented method of aspect-based sentiment analysis, the method comprising:
   receiving a collection of textual data including unorganized or unstructured text from online sources;
   extracting a set of aspects and a set of sentiment words from the textual data;
   identifying a set of aspect-sentiment word pairs from the extracted aspects and sentiment words, wherein each of the set of aspect-sentiment word pairs includes an aspect word from the set of aspects and a sentiment word from the set of sentiment words;
   identifying a subset of aspect-sentiment word pairs according to a set of predefined rules, wherein each of the subset of aspect-sentiment word pairs is determined to have an aspect-sentiment relationship according to the set of predefined rules, wherein the subset of aspect-sentiment word pairs are identified by comparing each of the set of aspect-sentiment word pairs to the set of predefined rules, and determining that an aspect-sentiment word pair has the aspect-sentiment relationship when the aspect-sentiment word pair satisfies one or more of the predefined rules; and
   grouping a plurality of aspects associated with the subset of aspect-sentiment word pairs into one or more clusters.

14. The computer-implemented method of claim 13, wherein, prior to extracting the set of aspects and the set of sentiment words from the textual data, the method further comprises:
   performing one or more of a noun phrase extraction process, a lexicon-based sentiment tagging process, a semantic role labeling process, or a syntactic parsing process on the textual data.

15. The computer-implemented method of claim 14, wherein extracting the set of aspects from the textual data further comprises:
   extracting the set of aspects from the textual data based on information obtained from one or more of the noun phrase extraction process or the semantic role labeling process.

16. The computer-implemented method of claim 14, wherein extracting the set of sentiment words from the textual data further comprises:
   extracting the set of sentiment words based on information obtained from the lexicon-based sentiment tagging process.

17. The computer-implemented method of claim 14, wherein identifying the set of aspect-sentiment word pairs further comprises:
   identifying the set of aspect-sentiment word pairs based on information obtained from the syntactic parsing process of the textual data.

18. The system of claim 1, wherein the instructions when executed by the processor further cause the processor to:
   identify sentiments associated with aspects of an entity to allow to address concerns expressed in the collected textual data in real-time.

* * * * *